(12) United States Patent
He et al.

(10) Patent No.: US 9,792,477 B1
(45) Date of Patent: *Oct. 17, 2017

(54) SYSTEM FOR, AND METHOD OF, CONTROLLING ILLUMINATION OF DIRECT PART MARKING (DPM) TARGETS TO BE READ BY IMAGE CAPTURE

(71) Applicant: SYMBOL TECHNOLOGIES, LLC, Lincolnshire, IL (US)

(72) Inventors: Duanfeng He, South Setauket, NY (US); Eugene B. Joseph, Coram, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,211

(22) Filed: May 16, 2016

(51) Int. Cl.
*G06K 7/10* (2006.01)
*G06K 7/14* (2006.01)

(52) U.S. Cl.
CPC ..... *G06K 7/10732* (2013.01); *G06K 7/10831* (2013.01); *G06K 7/1478* (2013.01)

(58) Field of Classification Search
None
See application file for complete search history.

(56) References Cited

U.S. PATENT DOCUMENTS

| 8,733,660 | B2 * | 5/2014 | Wang | G06K 7/10722 |
| | | | | 235/462.07 |
| 2006/0202036 | A1 | 9/2006 | Wang et al. | |
| 2009/0084847 | A1 | 4/2009 | He et al. | |
| 2010/0147952 | A1 | 6/2010 | Carlson | |
| 2013/0161392 | A1 | 6/2013 | Goren et al. | |
| 2015/0021400 | A1 * | 1/2015 | Lei | G06K 7/1404 |
| | | | | 235/462.42 |
| 2015/0144699 | A1 | 5/2015 | Sackett et al. | |
| 2016/0034737 | A1 | 2/2016 | Goren et al. | |

OTHER PUBLICATIONS

Gurevich et al., U.S. Appl. No. 14/938,355, filed Nov. 11, 2015.

* cited by examiner

*Primary Examiner* — Kristy A Haupt
(74) *Attorney, Agent, or Firm* — Yuri Astvatsaturov

(57) ABSTRACT

An array of pixels of a solid-state imaging sensor having a rolling shutter is sequentially exposed to capture images from an illuminated DPM target over successive frames for image capture by an imaging reader. The DPM target is illuminated at an elevated output power level for a fractional time period of a frame, and is not illuminated for at least a portion of a remaining time period of the frame for increased energy efficiency. Only a sub-array of the pixels is exposed during the fractional time period in which the DPM target is being illuminated at the elevated output power level.

13 Claims, 5 Drawing Sheets

SYSTEM FOR, AND METHOD OF, CONTROLLING ILLUMINATION OF DIRECT PART MARKING (DPM) TARGETS TO BE READ BY IMAGE CAPTURE

BACKGROUND OF THE INVENTION

The present disclosure relates generally to a system for, and a method of, controlling illumination of direct part marking (DPM) targets, such as raised, sunken, or etched optical codes, to be electro-optically read by image capture, and, more particularly, to controlling the illumination of a DPM target on a workpiece during operation of a solid-state imaging sensor having a rolling shutter that sequentially exposes an array of pixels to capture an image from the illuminated DPM target.

Direct part marking (DPM) has allowed workpieces to be directly marked, identified and traced to their origin, and its use has been growing in the automotive, aerospace, electronics, medical equipment, tooling, and metalworking industries, among many others. A machine-readable, high-density, two-dimensional, matrix-type, optical code or DPM target is comprised of multiple elements that are directly marked (imprinted, etched, molded, or dot-peened) on a workpiece. Solid-state imaging readers have been used to electro-optically read DPM targets by image capture. The imaging reader includes a solid-state imager (also known as an imaging sensor) with an array of photocells (also known as pixels), which correspond to image elements or pixels over a field of view of the sensor. The sensor is typically a two-dimensional charge coupled device (CCD) or a complementary metal oxide semiconductor (CMOS) device, with global or rolling exposure shutters, and associated circuits for producing and processing electrical signals corresponding to a two-dimensional array of pixel data over the field of view. The imaging reader also includes an illuminating light assembly for illuminating the field of view with illumination light, and an imaging lens assembly for capturing return ambient and/or illumination light scattered and/or reflected from a DPM target in the field of view, and for projecting the return light onto the sensor to initiate capture of an image of the DPM target. A programmed microprocessor or controller analyzes, processes and decodes the DPM target from the captured image.

Although generally satisfactory for its intended purpose, the use of imaging readers for reading DPM targets on workpieces has proven to be challenging. A typical DPM target is relatively small, e.g., less than 3 mm×3 mm. The workpieces themselves often have complicated, i.e., non-planar, curved, reflective surfaces. Contrast between the DPM targets and their workpiece backgrounds, especially from their outer, reflective background surfaces, is still often less than desirable. Unlike machine-readable codes printed in one color (for example, black) on paper of another color (for example, white), DPM targets are typically read not by a difference in intensity of the return light between regions of different color, but by shadow patterns that are cast by the raised or sunken or etched elements. Also, many workpiece backgrounds are dark in color, and absorb incident illumination light.

When using a global shutter sensor where all the pixels are exposed at the same time, it is known to turn the illuminating light assembly on to illuminate the DPM target only during the sensor's exposure time. This results in a very efficient use of the illumination light since the illuminating light assembly is turned off when not needed during non-exposure times. However, when using a lower cost, rolling shutter sensor where the pixels are sequentially exposed at different times, it is known to turn the illuminating light assembly on throughout the time of an entire frame, regardless of the sensor's exposure time, in order to illuminate and capture the entire DPM target image. A typical exposure time is much shorter than the frame time (e.g., for a sensor operating at 30 frames per second, the maximum exposure time could be about 4 ms, while the frame time is $\frac{1}{30}$ sec=33.3 ms). This results in a very inefficient use of the illuminating light assembly, especially for sensors having short exposure times and long frames. The additional electrical energy consumed during generation of the illumination light is not only wasteful and energy-inefficient, but also generates undesirable heat, reduces hand motion tolerance, creates undesirably bright illumination light that can annoy operators, and undesirably drains an on-board battery typically provided in handheld, wireless imaging readers, thereby requiring more frequent recharging, more downtime, and shorter working lifetimes. For imaging readers that do not use an on-board battery, the additional electrical energy consumed makes them not readily capable of being powered by a Universal Serial Bus (USB) port that has electrical maximum power limits.

Accordingly, there is a need to more efficiently control DPM target illumination in real-time to reduce average illumination power over a frame, conserve electrical energy, reduce generated excess waste heat, increase hand motion tolerance, reduce the annoyance from bright illumination light, and allow powered operation from a USB port, in the operation of imaging readers having rolling shutter sensors, which are preferred over global shutters, primarily for cost savings, with a minimal impact on reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
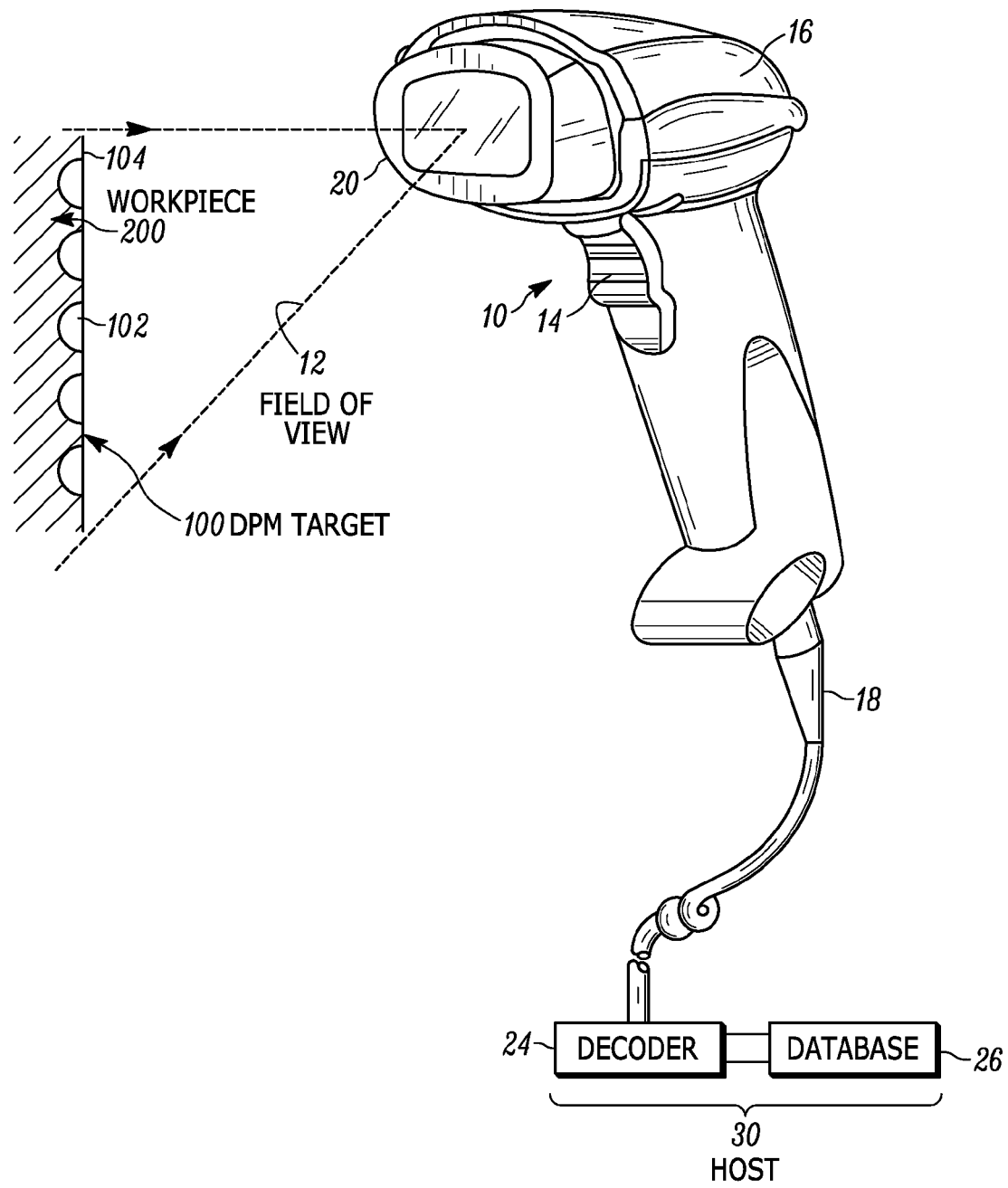
FIG. 1 is a view of an imaging reader for electro-optically reading DPM targets whose illumination is to be controlled in accordance with the present disclosure.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a control system for an imaging reader having an illuminating light assembly for illuminating a direct part marking (DPM) target with illumination light, and a solid-state imaging sensor, e.g., a charge coupled device (CCD) or a complementary metal oxide semiconductor (CMOS) device, with a rolling shutter for sequentially exposing an array of pixels over an imaging field of view to capture images from the illuminated DPM target over successive frames. The control system includes an illumination controller for controlling an output power level of the illumination light, and a main controller operatively connected to the imaging sensor and the illumination controller. The main controller controls the illumination controller to illuminate the DPM target at a first output power level, e.g., an elevated, non-zero, power level, for a fractional time period of a frame, and to illuminate the DPM target at a second lower output power level, e.g., a zero or intermediate power level, for at least a portion of a remaining time period of the frame. Only a sub-array of the pixels of the array is exposed during the fractional time period in which the DPM target is being illuminated at the first output power level. The main controller controls the imaging sensor to capture an image of the illuminated DPM target.

The lowered output power during the remaining time period of the frame (while the illumination controller is deenergized at the zero power level, or energized at the intermediate power level) renders the operation of the illuminating light assembly to be more efficient, especially for rolling shutter sensors having short exposure times and long frames. Less electrical energy is consumed as compared to the prior art during generation of the illumination light. On-board battery drain is reduced, thereby requiring less frequent recharging, less downtime, and longer working lifetimes. Less waste heat is generated. The annoying effect of bright illumination light on operators is reduced. Powered operation from a USB port is feasible.

Preferably, the imaging sensor captures a previous image of the DPM target in a previous frame that precedes the frame and detects an image size of the previous image. The image size can be detected once for one previous frame in a reading session, or multiple times every plurality of previous frames in the reading session, or preferably, for each and every previous frame in the reading session. The fractional time period during which the illumination controller illuminates the DPM target at the elevated power level is a function of the detected image size. If the image size is too small, then the fractional time period increases, and vice versa. The fractional time period occurs during a central time interval of the frame, and the sub-array of the pixels that are exposed during the central time interval is centrally situated in the array around an imaging centerline of the imaging field of view. The array is preferably a two-dimensional array in which the pixels are arranged in mutually orthogonal rows and columns, and the sub-array is a fractional number of the rows constituting either a single group of the rows extending centrally row-wise across the array, or a plurality of groups of the rows extending in mutual parallelism row-wise across the array. The fractional time period that the illumination controller illuminates the DPM target at the elevated output power level as compared to the remaining time period constitutes a duty cycle, and the elevated output power level is inversely proportional to the duty cycle.

Another aspect of the present disclosure relates to a method of illuminating a DPM target with illumination light, and of sequentially exposing an array of pixels of a solid-state imaging sensor having a rolling shutter over an imaging field of view to capture images from the illuminated DPM target over successive frames for image capture by an imaging reader. The method is performed by controlling an output power level of the illumination light, by illuminating the DPM target at a first or elevated output power level for a fractional time period of a frame, by illuminating the DPM target at a second, or zero, or intermediate, lower output power level that is less than the elevated power level for at least a portion of a remaining time period of the frame, by exposing only a sub-array of the pixels of the array during the fractional time period in which the DPM target is being illuminated at the first output power level, and by capturing an image of the illuminated DPM target.

Reference numeral 10 in FIG. 1 generally identifies an electro-optical reader for reading optical codes or DPM targets 100 by image capture over a field of view 12. The DPM targets 100 are associated with, or are applied either directly on workpieces 200, or on their packaging, and are jointly movable with the workpieces 200. The DPM target 100 is comprised of multiple elements 102 that are directly marked (imprinted, etched, molded, or dot-peened) on the workpiece 200. For example, an outer target surface 104 of a metal workpiece 200 may advantageously be dot-peened with such sunken elements 102 as hemispherical depressions that are located below, or behind, the target surface 104; or the outer target surface 104 of a plastic workpiece 200 may advantageously be molded with such raised elements 102 as hemispherical bumps that are located above, or in front of, the target surface 104; or the outer target surface 104 of any workpiece 200 may advantageously be etched with, for example, a laser, to form elements 102 of different light reflectivity closely adjacent the outer target surface 104 of the workpiece 200. Shapes, other than the shapes illustrated in FIG. 1, for the elements 102, and marking techniques, other than laser-etching, are also contemplated by this disclosure. The elements 102 may be arranged in a two-dimensional matrix-type array, or may be linearly arranged as a character string. In practice, the raised or sunken elements 102 are located at an elevation (height or depth) that is about one millimeter or less away from the target surface 104, while the etched elements 102 are generally flush with the target surface 104.

Figure 2:
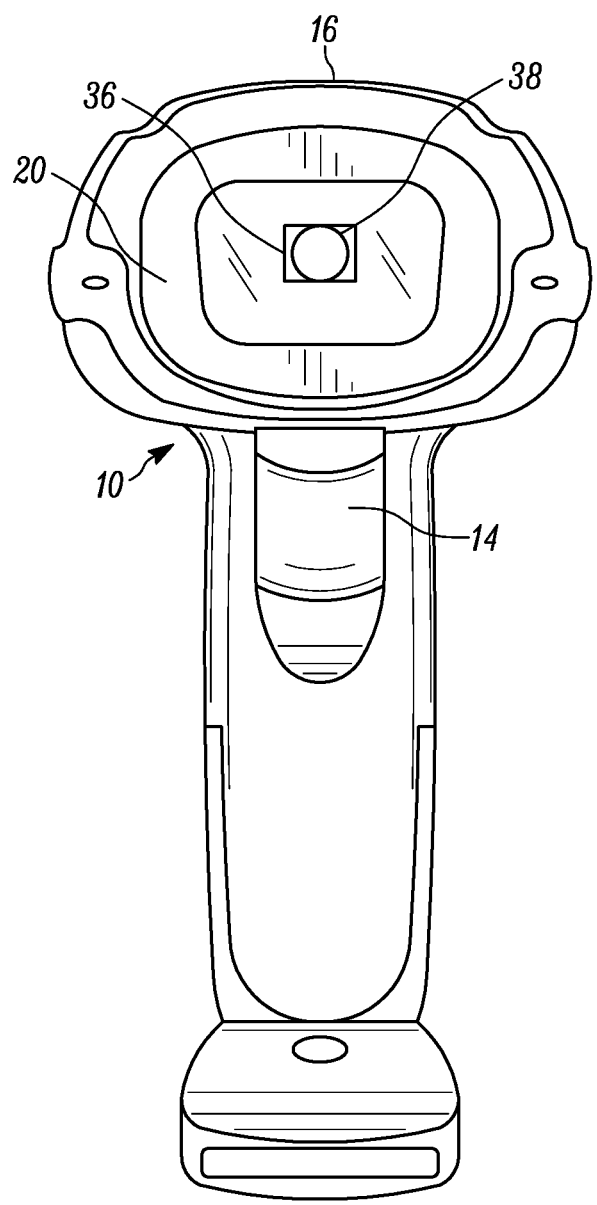
FIG. 2 is a front view of the reader of FIG. 1 on a reduced scale.

As illustrated in FIGS. 1-2, the reader 10 has a window 20 and a gun-shaped, mobile housing 16 held in an operator's hand, and moved and aimed at the DPM targets 100, in a handheld mode in which a trigger 14 is manually depressed to initiate reading of the DPM targets 100. A power and data cable 18 may be connected to the reader 10 to communicate with a remote host 30 that includes a decoder 24 and a database 26. The cable 18 can be omitted and replaced by a wireless transceiver, in which case, the reader 10 is electrically powered by an on-board battery. Housings of other shapes can be employed. When not held in the operator's hand, the reader 10 may be placed on a support surface, such as a countertop, or in a cradle or like support, in which case, the reader is stationary, and the DPM targets 100 are either presented to the window 20, or swiped past the window 20.

Figure 3:
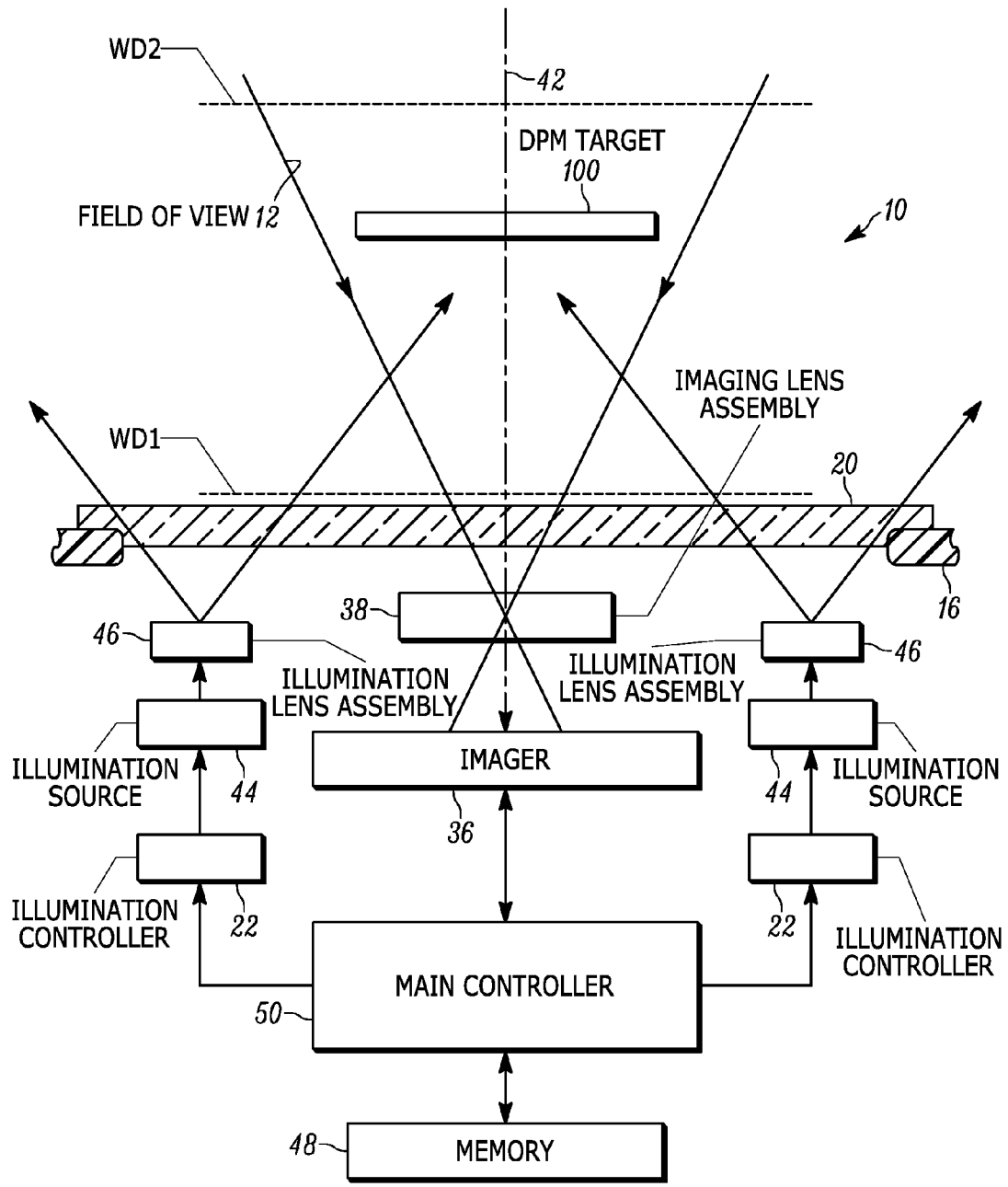
FIG. 3 is a diagrammatic view depicting system components of the reader of FIG. 1.

FIG. 3 schematically depicts an imaging module or scan engine mounted in the reader 10 behind the window 20. The imaging module includes a solid-state, imager or imaging sensor 36, and an imaging lens assembly 38, which may have one or more imaging lenses, such as a Cooke triplet. The sensor 36 has an array of pixels or photocells and may be a two-dimensional charge coupled device (CCD) or a complementary metal oxide semiconductor (CMOS) device, preferably having a rolling exposure shutter, and is analogous to the sensors used in electronic digital cameras. The rolling shutter sequentially exposes the pixels that are typically arranged in mutually orthogonal rows and columns. The sensor 36 and the lens assembly 38 are together operative for capturing return light scattered and/or reflected from a DPM target 100 to be read by image capture over the imaging field of view 12 along an optical path or axis 42 through the window 20 and over a range of working distances between a close-in working distance (WD1) and a far-out working distance (WD2). In a preferred embodiment, WD1 is either at, or about a half inch away from, the window 20, and WD2 can be two feet and more from the window 20, although other numerical values are contemplated.

The reader 10 also has an energizable illuminating light assembly for illuminating the DPM target 100 with illumination light from an illumination light source when energized. The illuminating light assembly includes, as illustrated, a pair of illumination light sources or light emitting diodes (LEDs) 44, and a corresponding pair of illumination lens assemblies 46 to uniformly illuminate the DPM target 100 with illumination light when energized. The illumination LEDs 44 and the illumination lens assemblies 46 may be symmetrically located at opposite sides of the sensor 36.

A main controller or programmed microprocessor 50 controls operation of the electrical components of the assemblies, processes the captured return light from the DPM target 100 as an image, and decodes the captured image. A memory 48 is connected, and accessible, to the main controller 50. The main controller 50 includes an electrical current driver or illumination controller 22 for each LED 44. Each illumination controller 22 is preferably hardware-based, but could also be software-based.

As previously mentioned, this disclosure is concerned with controlling the DPM target illumination in an imaging reader having a rolling shutter with the goal of more efficiently utilizing the illuminating light assembly, conserving electrical power, reducing waste heat, reducing battery drain, increasing hand motion tolerance, reducing the annoying effect of bright illumination light, and enabling powered operation from a USB port.

Hence, in accordance with this disclosure, the main controller 50 controls the illumination controller 22 to illuminate the DPM target 100 at a first or elevated output power level for a fractional time period of a frame, and to illuminate the DPM target 100 at a second, or zero, or intermediate, lower output power level that is less than the elevated power level for at least a portion of a remaining time period of the frame. Advantageously, the illumination controller 22 is deenergized by the main controller 50 during the portion of the remaining time period of the frame. Only a sub-array of the pixels of the array is exposed during the fractional time period in which the DPM target 100 is being illuminated at the first or elevated output power level. The main controller 50 controls the imaging sensor 36 to capture an image of the illuminated DPM target 100.

As described above, it is known in the art to turn the illuminating light assembly on throughout the time of an entire frame in which the pixels are sequentially exposed by a rolling shutter, regardless of the exposure time, in order to illuminate and capture the entire DPM target image. By lowering the output power, especially by deenergizing the illumination controller 22 during the remaining time period of the frame, the operation of the illuminating light assembly is more energy efficient, especially for rolling shutter sensors having short exposure times and long frames. Less electrical energy is consumed as compared to the prior art during generation of the illumination light. On-board battery drain is reduced, thereby requiring less frequent recharging, less downtime, and longer working lifetimes. Less waste heat is generated. The annoying effect of bright illumination light is reduced. For imaging readers that do not use an on-board battery, the additional electrical energy conserved makes them readily capable of being powered by a Universal Serial Bus (USB) port that has electrical power limits, e.g., 0.5 amperes at 5 volts.

Figure 4:
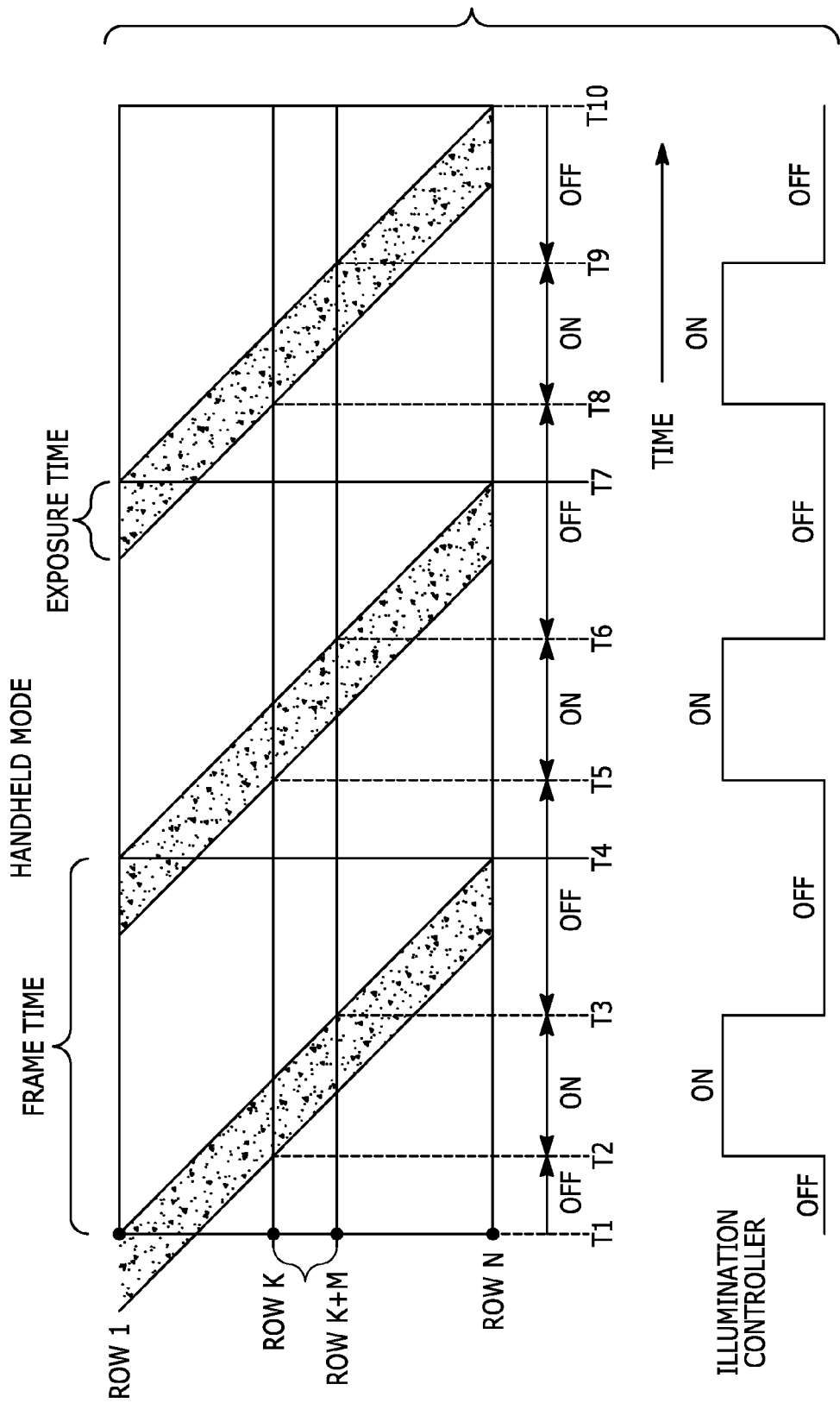
FIG. 4 is a set of graphs depicting how the illumination is controlled in the reader of FIG. 1.

FIG. 4 depicts the operation of the system of this disclosure, of particular benefit for the handheld reader 10. Three successive frame times and their exposure times (shown by speckled areas) are illustrated. The first, second, and third frames start at times T1, T4, and T7, respectively; and end at times T4, T7, and T10, respectively. For a rolling shutter, each exposure time starts slightly before its respective frame time. The pixels of the array are arranged in mutually orthogonal rows and columns; and the first row 1 is shown at the top, while the last row N is shown at the bottom, of FIG. 4. In a central portion of the array, a plurality or single group or middle band of the rows, which constitute a fraction of all the rows of the array, i.e., a sub-array, extends row-wise horizontally across the array, and starts from a higher middle row K and ends at a lower middle row K+M, where M is one or more. Exposure and read-out of the pixels begins at row 1, and continues along the illustrated downwards slope from left to right, over increasing time, across the middle rows K and K+M, and ends at row N.

As also shown in FIG. 4, the illumination controller 22 is turned ON by the main controller 50 to illuminate the DPM target 100 at the elevated output power level for a fractional time period of a frame, i.e., between times T2 and T3 of the first frame, between times T5 and T6 of the second frame, and between times T8 and T9 of the third frame, and so on for successive frames. The illumination controller 22 is preferably turned OFF by the main controller 50 during the remaining time period of each frame, i.e., between times T1 and T2 and times T3 and T4 of the first frame; between times T4 and T5 and times T6 and T7 of the second frame; and between times T7 and T8 and times T9 and T10 of the third frame, and so on for successive frames. Rather than being fully turned OFF, the illumination controller 22 can be turned ON by the main controller 50 to illuminate the DPM target 100 at a lower intermediate output power level during the remaining time period of each frame. All of the pixels of the imaging sensor 36 capture an image of the DPM target 100 during the entire frame, i.e., not only when the illumination controller 22 is turned ON, but also, when the illumination controller 22 is turned OFF. In the latter case, ambient light illuminates the DPM target 100.

Thus, the illumination controller 22 is turned ON only at a central interval of each frame, e.g., between times T2 and T3 of the first frame, and only for a central group or middle band of the exposed pixels, e.g., the pixels between middle rows K and K+M, which are situated at opposite sides of an imaging centerline of the imaging field of view 12. The DPM target 100 is expected to be centrally located in the field of view 12, and to occupy a relatively small portion of the field of view 12 in the vertical direction. Thus, it is the central, low vertical height, portion of the field of view 12 that is being illuminated, and that is where the DPM target 100 is expected to be, as well as how the DPM target 100 is seen by the imaging sensor 36. The fractional time period that the illumination controller 22 illuminates the DPM target 100 at the elevated output power level as compared to the remaining time period in each frame constitutes a duty cycle, and the elevated output power level is inversely proportional to the duty cycle to keep the average illumination power level across each entire frame relatively constant.

Preferably, the imaging sensor 36 captures a previous image of the DPM target 100 in a previous frame that precedes the frame and detects an image size of the previous image. The image size can be detected once for one previous frame in a reading session, or multiple times every plurality of previous frames in the reading session, or preferably, for each and every previous frame in the reading session. The fractional time period during which the illumination controller 22 illuminates the DPM target 100 at the elevated power level is a function of the detected image size. If the image size is too small, then the fractional time period increases, and vice versa.

Figure 5:
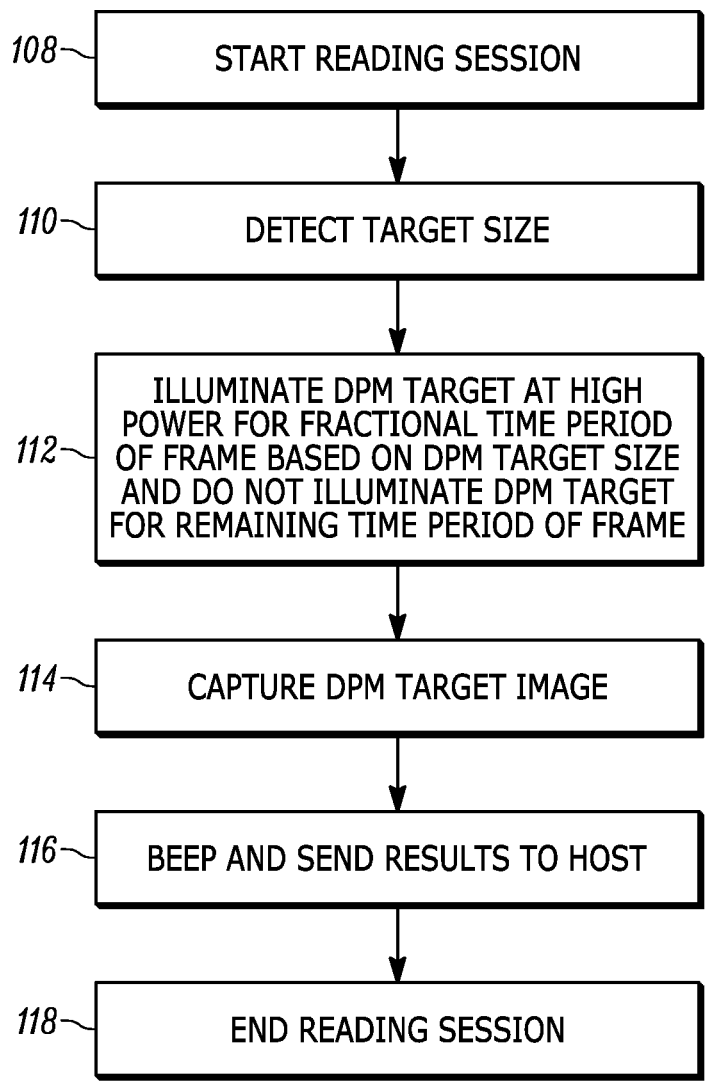
FIG. 5 is a flow chart depicting steps performed in accordance with the method of the present disclosure Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

Turning now to the flow chart of FIG. 5, the method of illuminating the DPM target 100 with illumination light, and of capturing an image from the illuminated DPM target 100, begins a reading session at step 108. The size of the DPM target 100 is detected in step 110, and then the DPM target 100 is illuminated at an elevated power level for a fractional, e.g., central, time period of a frame, and is preferably not illuminated, or illuminated at a lower power level, for the remainder of the frame (step 112). The duration of the fractional time period is proportional to the detected size of the DPM target 100. Only a sub-array of the pixels of the array is exposed during the fractional time period in which the DPM target 100 is being illuminated at the first output power level. An image of the illuminated DPM target 100 is captured by the array (step 114). Upon a successful decode, the controller 50 causes a beeper to beep, and the results are sent to the host 30 (step 116). The reading session ends at step 118.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A control system for an imaging reader having an illuminating light assembly for illuminating a direct part marking (DPM) target with illumination light, and a solid-state imaging sensor for exposing an array of pixels over an imaging field of view to capture images from the illuminated DPM target over successive frames, the control system comprising:
an illumination controller to control an output power level of the illumination light; and
a main controller in communication with the imaging sensor and the illumination controller, the illumination controller to cause the illuminating light assembly to:
illuminate the DPM target at a first output power level for a fractional time period of at least one of the frames; and
illuminate the DPM target at a second output power level that is less than the first output power level for at least a portion of a remaining time period of the at least one frame, wherein:
the imaging sensor is to detect a size of the DPM target;
the fractional time period is proportional to the detected size of the DPM target;
only a sub-array of the pixels of the array are exposed during the fractional time period; and
the main controller is to control the imaging sensor to capture an image of the illuminated DPM target.

2. The system of claim 1, wherein the second output power level is a zero power level.

3. The system of claim 2, wherein the fractional time period as compared to the remaining time period constitutes a duty cycle, and wherein the first output power level is inversely proportional to the duty cycle.

4. The system of claim 1, wherein the fractional time period occurs during a central time interval of the at least one frame, and wherein the sub-array of the pixels that are exposed during the central time interval is centrally situated in the array at opposite sides of an imaging centerline of the imaging field of view.

5. The system of claim 1, wherein the array is a two-dimensional array in which the pixels are arranged in mutually orthogonal rows and columns, and wherein the sub-array is a fractional number of the rows constituting a single group of the rows extending centrally row-wise across the array.

6. The system of claim 1, wherein the array is a two-dimensional array in which the pixels are arranged in mutually orthogonal rows and columns, and wherein the sub-array is a fractional number of the rows constituting a plurality of groups of the rows extending in mutual parallelism row-wise across the array.

7. A method of illuminating a direct part marking (DPM) target with illumination light, and of exposing an array of pixels of a solid-state imaging sensor to capture images from the illuminated DPM target over successive frames, the method comprising:
controlling an output power level of the illumination light;
illuminating the DPM target at a first output power level for a fractional time period of at least one of the frames;
detecting, using a logic circuit, a size of the DPM target;
configuring, using the logic circuit, the fractional time period to be proportional to the detected size of the DPM target;
illuminating the DPM target at a second output power level that is less than the first power level for at least a portion of a remaining time period of the at least one of the frames;
exposing only a sub-array of the pixels of the array during the fractional time period; and
capturing an image of the illuminated DPM target.

8. The method of claim 7, wherein the illuminating of the DPM target at the second output power level is performed at a zero power level.

9. The method of claim 8, wherein the fractional time period as compared to the remaining time period constitutes a duty cycle, and further comprising configuring the first output power level to be inversely proportional to the duty cycle.

10. The method of claim 7, further comprising configuring the fractional time period to occur during a central time interval of the at least one of the frames, and wherein the sub-array of the pixels are centrally located at opposite sides of an imaging centerline of the imaging field of view.

11. The method of claim 7, wherein the array is arranged as a two-dimensional array in which the pixels are arranged in mutually orthogonal rows and columns, and the sub-array is configured as a fractional number of the rows constituting a single group of the rows extending centrally row-wise across the array.

12. The method of claim 7, wherein the array is configured as a two-dimensional array in which the pixels are arranged in mutually orthogonal rows and columns, and wherein the sub-array is configured as a fractional number of the rows constituting a plurality of groups of the rows extending in mutual parallelism row-wise across the array.

13. An apparatus, comprising:
a light source to illuminate a target;
a sensor to capture images over frames;
a logic circuit configured to:
cause the light source to illuminate the target with light at a first output power level for a fractional time period of a first one of the frames;
detect a size of the target;
configure the fractional time period to be proportional to the detected size of the target;
cause the light source to illuminate the target at a second output power level that is less than the first power level for at least a portion of a remaining time period of the first one of the frames, wherein only a subset of pixels of the sensor are exposed during the fractional time period.

* * * * *